US011392486B1

(12) United States Patent
Vadaparty et al.

(10) Patent No.: US 11,392,486 B1
(45) Date of Patent: Jul. 19, 2022

(54) MULTI-ROLE, MULTI-USER, MULTI-TECHNOLOGY, CONFIGURATION-DRIVEN REQUIREMENTS, COVERAGE AND TESTING AUTOMATION

(71) Applicant: Morgan Stanley Services Group Inc., New York, NY (US)

(72) Inventors: Kumar Vadaparty, Belle Mead, NJ (US); Vishal Agrawal, Montville, NJ (US); Vilas Mhatre, Long Branch, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 17/371,842

(22) Filed: Jul. 9, 2021

(51) Int. Cl.
G06F 11/36 (2006.01)
(52) U.S. Cl.
CPC ...... G06F 11/3688 (2013.01); G06F 11/3684 (2013.01); G06F 11/3692 (2013.01)
(58) Field of Classification Search
CPC ............ G06F 11/3684; G06F 11/3688; G06F 11/3692
See application file for complete search history.

(56) References Cited

U.S. PATENT DOCUMENTS

| | | | |
|---|---|---|---|
| 9,690,577 B1 * | 6/2017 | Crew | G06F 11/3672 |
| 10,630,811 B1 | 4/2020 | Vadaparty et al. | |
| 10,769,714 B1 | 9/2020 | Vadaparty et al. | |
| 10,867,343 B1 | 12/2020 | Vadaparty et al. | |
| 10,867,351 B1 | 12/2020 | Vadaparty et al. | |
| 10,951,737 B1 | 3/2021 | Vadaparty et al. | |
| 2005/0203717 A1 * | 9/2005 | Parimi | G06F 11/263 702/188 |
| 2007/0220342 A1 * | 9/2007 | Vieira | G06F 11/3688 714/33 |
| 2007/0234121 A1 | 10/2007 | He et al. | |
| 2011/0088018 A1 | 4/2011 | Foley et al. | |
| 2012/0260129 A1 | 10/2012 | Wilson et al. | |
| 2013/0042222 A1 | 2/2013 | Maddela | |

(Continued)

OTHER PUBLICATIONS

Maykin Warasart, "An Improved Scheduling Mechanism for Automated Testing Framework based on Spreadsheet DDT," 2019 [ retrieved on Mar. 8, 2022], The 5th RMUTT Global Business and Economics International Conference, pp. 97-105, downloaded from <url >:https://mk.in.th/pub/2019-05-23_RTBEC2019_AutomatedDDT. pdf. (Year: 2019).*

*Primary Examiner* — S. Sough
*Assistant Examiner* — Stephen D Berman
(74) *Attorney, Agent, or Firm* — K&L Gates LLP (57) ABSTRACT

Computer systems and methods test applications of an enterprise computer system. The enterprise computer system comprises a test orchestration engine that is configured to receive a human-readable configuration file that comprises: a test script model that specifies testing activities for an application of the enterprise computer system; an application model that specifies attribute values for the application for the testing of the application; and a script model that specifies context parameters for the testing of the application. The test orchestration engine generates, at compile time, metadata code artifacts from the configuration file; and orchestrate, at run time, testing of the application based on the metadata code artifacts generated from the configuration file.

23 Claims, 6 Drawing Sheets

(56) References Cited

U.S. PATENT DOCUMENTS

| | | |
|---|---|---|
| 2014/0181793 A1 | 6/2014 | Kaliappan |
| 2015/0007149 A1 | 1/2015 | Maddela |
| 2015/0100831 A1 | 4/2015 | Nanjundappa et al. |
| 2017/0046251 A1* | 2/2017 | Jafary ................. G06F 11/3688 |
| 2018/0260309 A1 | 9/2018 | Simoni |
| 2018/0322034 A1 | 11/2018 | Kou et al. |
| 2018/0322035 A1 | 11/2018 | Mohanty et al. |
| 2018/0322036 A1* | 11/2018 | Alam .................. G06F 11/3604 |
| 2018/0349256 A1* | 12/2018 | Fong ........................ G06F 40/35 |
| 2019/0235999 A1* | 8/2019 | Everitt ................. G06F 16/252 |
| 2020/0174917 A1 | 6/2020 | Patel et al. |
| 2020/0327043 A1 | 10/2020 | Dyavappa et al. |
| 2020/0401506 A1* | 12/2020 | Sathianarayanan ........................... G06F 11/3688 |
| 2021/0089436 A1 | 3/2021 | Gangina |

* cited by examiner

TestScript1

| Test Script ID | TestScript1 | | | | |
|---|---|---|---|---|---|
| Activity Group | Activity ID | Activity Name | Function | Application (Model) | SET/GET | Comments |
| 1 | ID1 | Activity1 | Function1 | App1 | SET (A) | |
| 2 | ID2 | Activity2 | Function2 | App1 | SET (B) | |
| 3 | ID3 | Activity3 | Function3 | App1 | USE ("P," A, B) | |
| 4 | ID4 | Activity4 | Function4 | App1 | | |

TestScript2

| Test Script ID | TestScript2 | | | | |
|---|---|---|---|---|---|
| Activity Group | Activity ID | Activity Name | Function | Application (Model) | SET/GET | Comments |
| 1 | ID1 | Activity1 | Function1 | App1 | SET (C) | |
| 2 | ID2 | Activity2 | Function2 | App1 | SET (D) | |
| 3 | ID3 | Activity3 | Function3 | App1 | USE ("P," C, D) | |
| 4 | ID4 | Activity4 | Function4 | App1 | | |

FIG. 3

| Application | Activities | Attribute Type | Attribute Value Type | Attribute Value |
|---|---|---|---|---|
| App1 | Activity1, Activity 2, Activity 3 | AttType1 | Scaler | AttributeValue1 |
| App1 | Activity1, Activity 2, Activity 3 | AttType1 | Scaler | AttributeValue2 |
| App1 | Activity5 | AttType2 | KeyValuePair | AttributeValue3 |

FIG. 4

Data Properties for Application-Specific Attributes

| Application | Attribute Type | Attribute Name | Environment | Locator Path | Locator Value |
|---|---|---|---|---|---|
| App1 | AttType1 | AttributeName1 | Env1 | Xpath | //footer/xxx... |
| | | | | | |
| | | | | | |
| | | | | | |

FIG. 5

| Application | Environment | Resource ID | Resource Type | Resource URI |
|---|---|---|---|---|
| App1 | Env1 | | App URL | https://... |
| App2 | Env2 | | API connection info | jdbc:sqlserver://... |
| | | | | |
| | | | | |

MULTI-ROLE, MULTI-USER, MULTI-TECHNOLOGY, CONFIGURATION-DRIVEN REQUIREMENTS, COVERAGE AND TESTING AUTOMATION

BACKGROUND

On a typical trading day, a large brokerage firm processes hundreds of thousands of transactions. Numerous systems with various operating systems and running numerous applications are involved in executing such transactions. A typical transaction often involves user interfaces, middle-tier application servers, database, middleware technologies and mainframe systems.

Performing automated testing of a single end-to-end transaction across all of these tiers is a significant challenge. The present state of the art is that numerous tools are used to test the various systems involved in the transactions. This makes it time consuming to train quality assurance staff on the various testing tools. Another problem is that thousands of lines of custom test code, spread across the multiple applications, are required to test the disparate systems with the current state of art.

SUMMARY

In one general aspect, the present invention is directed to systems and method for testing applications of an enterprise computer system, such as a brokerage firm computing system that receives and executes trades or financial securities. In various embodiments, the enterprise computer system comprises a first sub-system, where the first sub-system runs a first application. The first application comprises one or more application-specific attributes. The first sub-system may include an application server that runs a user interface (UI) application; a mainframe sub-system that runs a mainframe application; a middle tier sub-system that runs a middle tier application; and/or a database system than runs a database application. The enterprise computer system also comprises a test orchestration engine that is in communication with the first sub-system. The test orchestration engine is configured to receive a human-readable configuration files that comprises: a test script model that specifies testing activities for the first application; an application model that specifies attribute values for the one or more application-specific attributes of the first application for the testing of the first application; and a script model that specifies context parameters for the testing of the first application. The test orchestration engine is also configured to generate, at compile time, metadata code artifacts from the configuration file; and orchestrate, at run time, testing of the first application based on the metadata code artifacts generated from the configuration file. As such, the testing of the first application: performs the activities specified in the test script model for testing the first application; uses the application-specific attributes for the first application in the application model; and uses the context parameters for testing the first application passed from the script model.

Embodiments of the present invention can provide extensible light weight, automated testing framework that can be used across multiple roles within the enterprise and across multiple technologies that involves a series of sequential or parallel set of testing activities. The framework can be code-free, where actual testing activities are specified in easy to read activities separate from the details of the underlying application being tested. This separation is crucial to ensure on-going maintenance of these test scripts is low and does not require highly skilled resources. The framework can additionally permit different programs to be tested independently or in a single transaction. These and other benefits that can be realized through various embodiments of the present invention will be apparent from the description to follow.

FIGURES

Various embodiments of the present invention are described herein by example in conjunction with the following figures.

DESCRIPTION

Figure 1:
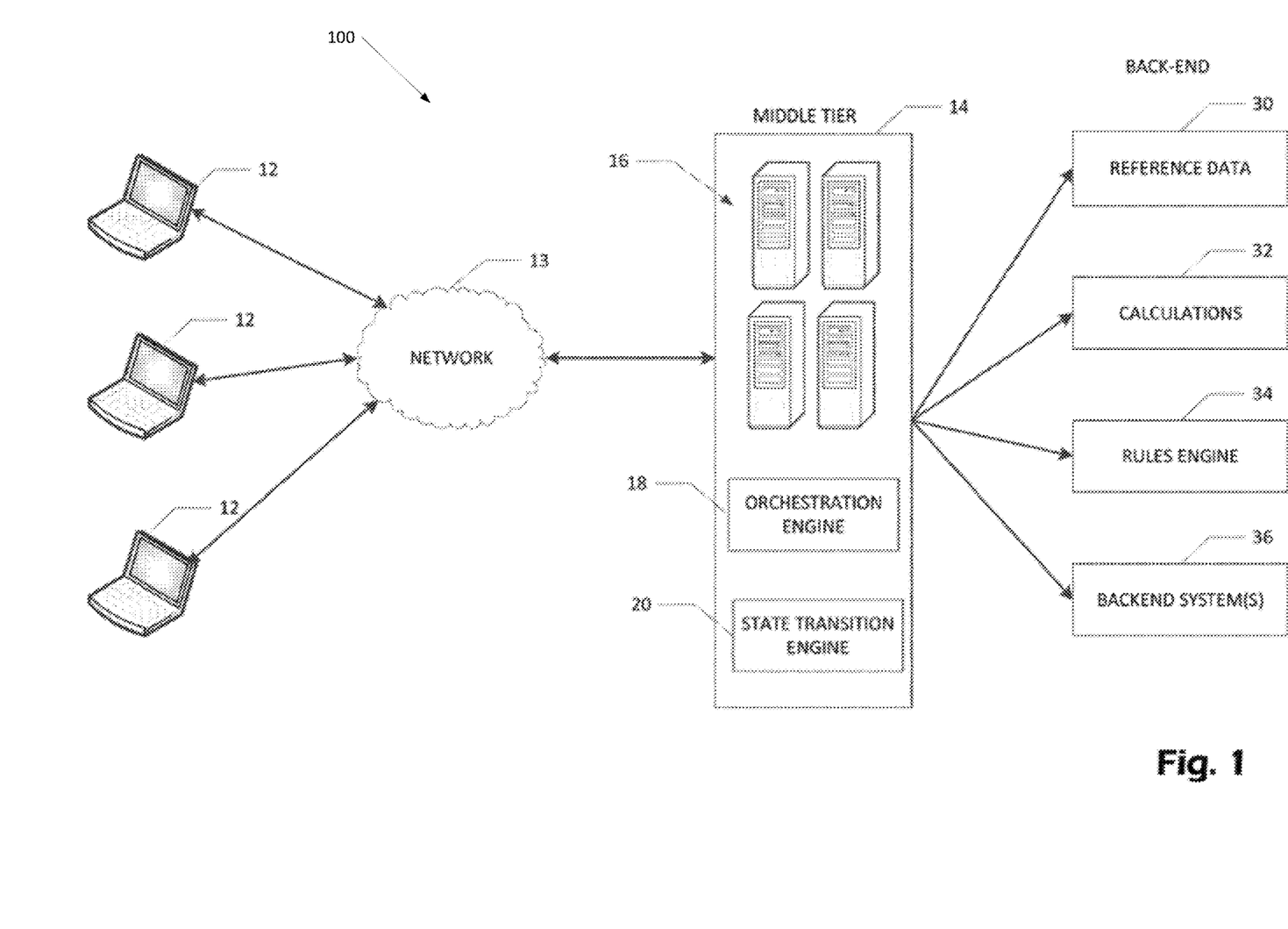
FIG. 1 is a block diagram of an order management system according to various embodiments of the present invention.

The testing systems of the present invention can be used to test applications running in various types of large, integrated computer systems, referred to herein as an "enterprise computer system," because it could be the computer system for an enterprise (e.g., firm, organization, etc.). The enterprise computer system could include, for example, an order management system of a brokerage firm that handles trade orders for financial products. Before explaining the details of the testing system, an overview of an exemplary order management system is provided for context. To that end, FIG. 1 illustrates aspects of an exemplary trade order management system 100. Users, at computer devices 12, submit trade orders for financial securities to a middle tier 14 via a data network 13 (which may be the Internet, a LAN, a WAN, etc.). The middle tier 14 may be implemented with servers 16, which may include and execute, for example, an orchestration engine 18 and a state transition engine 20. The orchestration engine 18 is a software program executed by the servers 16 that, when executed, orchestrates calls to back-end systems to obtain data and execute the necessary business logic to respond to the user requests. In such a context, the back-end systems may comprise reference data systems 30, calculation engines 32, rules engines 34 and other back-end systems 36 that are required to implement a trade order. The back-end systems 30-36 may be implemented with suitable computer systems, such as database management systems, servers, mainframes, etc.

The state transition engine 20 preferably is a Java-based rules engine that handles the transitions of trade orders from one state to the next in the progression of the trade order. In that connection, the state transition engine 18 is a software system, that when executed by the processors of the middle tier servers 16, executes state transition business rules for the order management system in a runtime production environment. It essentially handles the "order book" for the trades, recording the details of the order and its current status. As mentioned above, common states for trade orders include pre-approval (if approval is needed for some reason), open, filled, partially filled, canceled, confirmed, rejected, booked, etc. The applicable states for trade orders typically vary somewhat based on the type of security involved, such as stocks, mutual funds, bonds or fixed income securities, derivatives, foreign exchange, etc. The transitions from one state to another are governed by one or more conditions. For example, if the conditions for the transition from State A (e.g., open) to State B (e.g., filled) for a particular trade order are satisfied, the state transition engine 18 transitions the trade from State A to State B in the order book. Often, the middle tier servers 16 need to place back-end calls to determine whether the conditions for state transition are met. In such a context, the back-end systems may comprise reference data systems 30, calculation engines 32, rules engines 34 and other back-end systems 36.

A rules engine 34 is a software system that executes business rules in a runtime production environment. The rules may implement legal regulations, company policies, or come from other sources. In the context of an order management system, for example, the rules engine 34 may apply rules to determine whether a trade order is acceptable; e.g., whether it should be placed or whether it should be rejected due to an applicable rule, and such business rules could draw from legal regulations, policies of the broker-dealer, or even client-specific rules, for example. The rules may also specify entity models and orchestration steps, the later of which may be utilized by the orchestration engine 18.

More details about trade order management systems can be found in: U.S. Pat. No. 10,867,351, titled "Metadata-driven rules processing engine for order management system," U.S. Pat. No. 10,951,737, titled "Mainframe service request orchestrator and multiplexer"; U.S. Pat. No. 10,769,714, titled "Metadata drive orchestration engine,"; and application Ser. No. 16/272,361, filed Feb. 11, 2019, titled "Meta data driven state transition engine for order management system," all of which are hereby incorporated herein by reference in their entirety.

Figure 2:
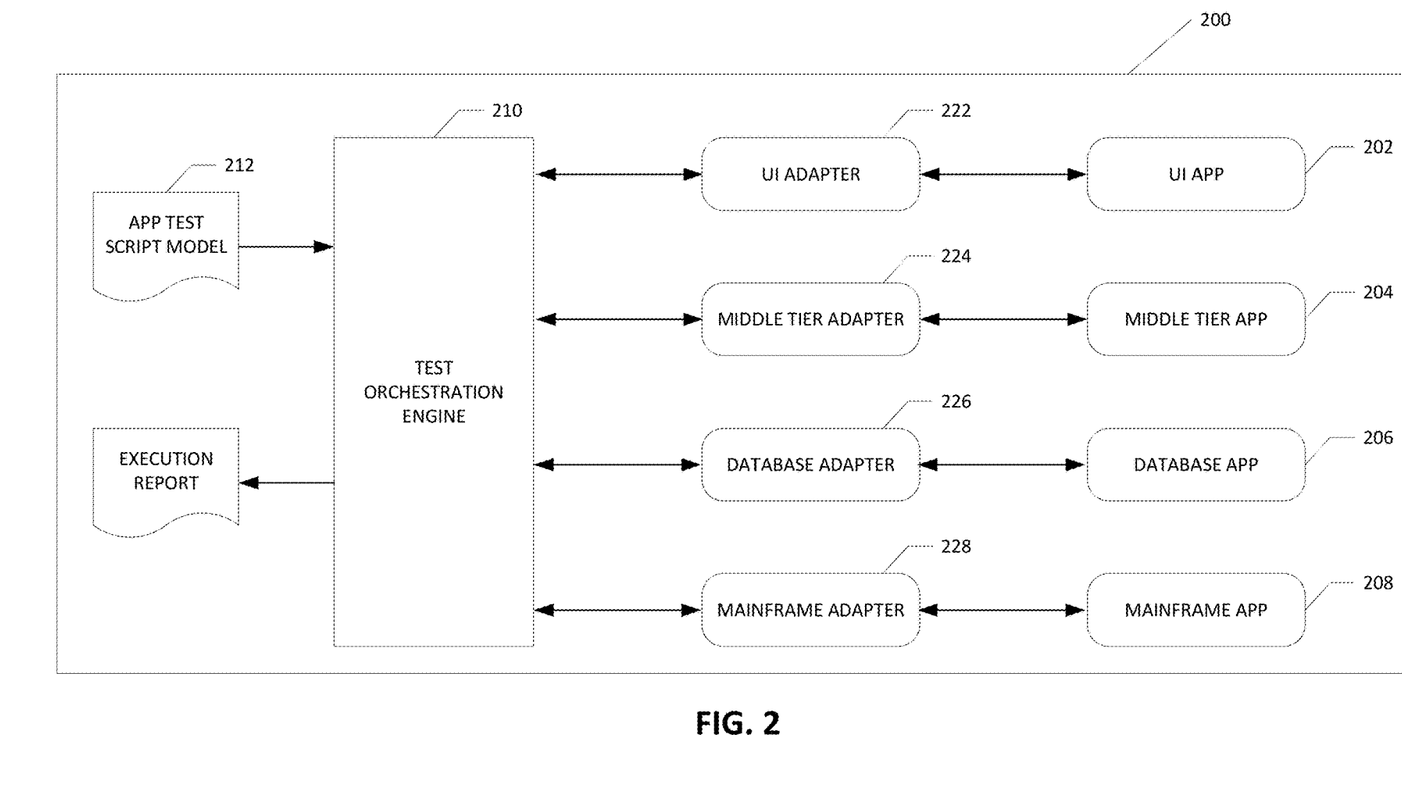
FIG. 2 is block diagram depicting, according to various embodiments of the present invention, the test orchestration engine of the enterprise computer system.

FIG. 2 illustrates an enterprise computer system 200 according to various embodiments of the present invention. In the illustrated embodiment, the applications ("apps") 202, 204, 206, 208 represent apps of the enterprise to be tested. The apps include a user interface (UI) app 202, a middle tier app 204, a database app 206 and a mainframe app 208. These apps may run on respective sub-systems of the enterprise computer system. For example, the UI app 202 may run on an application server of the enterprise computer system 200; the middle tier app 204 may run on a middle tier sub-system; the database app 206 may run on a database sub-system; and the mainframe app may run on a mainframe sub-system. The apps 202-208 may be part of the trade order management system 100 shown in FIG. 1, for example. The UI app 202 can be an app used by an employee of the brokerage firm via a user interface provided by an application server of the enterprise computer system. For example, the UI app 202 may be used by a user of the computer device 12 in FIG. 1 to submit trade orders to the middle tier 14. The UI app 202 could also be an app used by a person associated with the brokerage firm to review trades, etc. The UI app 202 may be browser- or HTML-based. That is, the computer system 100 may include one or more application servers that host web- or HTML-based applications used by employees of the enterprise (e.g., brokerage firm). The employees may access the web- or HTML-based application via a browser on the employee's computer device.

The middle tier 204 represents an app run by the middle tier sub-system 14 (see FIG. 1). The database app 206 represents an app that makes calls to a database of the order management system. The mainframe app 208 represents an app run by a mainframe component/sub-system of the order management system. FIG. 2 depicts only one UI app 202, one middle tier app 204, one database app 206 and one mainframe app 208 for illustrative purposes. It should be recognized that the enterprise computer system 200 could, and likely does, include numerous instances of each type of app.

The illustrated enterprise computer system 200 also includes a test orchestration engine 210. As described herein, the test orchestration engine 210 generates test scripts for the various target apps 202, 204, 206, 208 to be tested based on an app test script model 212 received by the test orchestration engine 210. The app test script model 212 may include various tables, as described further below, that specify attributes and parameters for the test scripts for the apps 202, 204, 206, 208. The app test script model 212 may be embodied as a spreadsheet, for example. The test orchestration engine 210 converts the test activities defined in the app test script model 212 into code artifacts at compile time for the test orchestration engine 210 to use at run time for testing the apps 202, 204, 206, 208. The artifacts may include meta-data representations of the activities to be performed as part of the tests.

The app test script model 212 can be stored in a memory of the test orchestration engine 210 (e.g., uploaded from a remote computer system of the computer system 100) and the test orchestration engine 210 converts the app test script model 212 at compile time to meta-data code artifacts to be stored in memory of the test orchestration engine 210 and used by the test orchestration engine 210 at runtime to test the apps 202, 204, 206, 208 according to the attributes, parameters, etc. specified in the app test script model 212. The code artifacts should be in a format suitable for use by the test orchestration engine 210. In various embodiments, the code artifacts may be written in Extensible Markup Language (XML), or JavaScript Object Notation (JSON), for example.

The test orchestration engine 210 may be in communication with the apps 202-208, and the respective subs-systems on which they run, via one or more data communication networks, such as a LAN or WAN of the enterprise, for example. The illustrated enterprise computer system 200 may include a number of adapters 222, 224, 226, 228 to provide interfaces between the test orchestration engine 210 and the respective apps 202, 204, 206, 208. For example, the enterprise computer system 200 may include a UI adapter 222 for interfacing with the UI app 202; a middle tier adapter 224 for interfacing with the middle tier app 204; a database adapter 226 for interfacing with the database app 206; and a mainframe adapter 228 for interfacing with the mainframe app 208. The UI adapter 222 may comprise, for example, a Selenium adapter. Selenium is a portable framework for testing web applications. The middle tier adapter 224 may comprise, for example, a Representational State Transfer (REST) adapter and/or a MQ adapter. A REST adapter can enable exchange messages between the test orchestration engine 210 and the middle tier app 204, and can support dynamic URLs, REST API polling, multiple operations per channel as well as XML and JSON data formats. MQ is a family of message-oriented middleware products that allows independent and potentially non-concurrent applications on a distributed system to securely communicate with each other using messages. The mainframe adapter 228 may comprise a SOAP (Simple Object Access Protocol) adapter that exchanges SOAP message between the test orchestration engine 210 and the mainframe app 208. SOAP is a messaging protocol specification for exchanging structured information in the implementation of web services in computer networks. It uses XML Information Set for its message format, and relies on application layer protocols, most often Hypertext Transfer Protocol (HTTP), although some legacy systems communicate over Simple Mail Transfer Protocol (SMTP), for message negotiation and transmission. As shown in FIG. 2, the adapters 222, 224, 226, 228 are separate preferably from the test orchestration engine 210. That way, the adapters 222, 224, 226, 228 can be changed or replaced without affecting the test orchestration engine 210.

The app test script model 212 may include one or more codeless test script models, script models, app models and resource models that are linked and that collectively provide the necessary information for the test orchestration engine 210 to generate the metadata code artifacts for the testing of the apps 202-208. As described further below, a test script can be a defined sequence of activities to be executed by the test orchestration engine 210 at runtime. The testing framework can utilize reusable functions which are used in these activities. The app model and the scripts model can be configuration models. The app models allow separation of application-specific information from the test scripts owned by the application development team. For example, application-specific attributes may comprise data properties for the apps, such as, for example, user interface element locators for the UI app 202. That is, for example, the application-specific attribute for an app can specify the type of data and corresponding data values to be used by the application for the testing. This approach separates the test script from the underlying application model, eliminating the need to update potentially thousands of test scripts as the application changes. That is, testing activities specified in the test script model can be updated independent of the application-specific data attributes in the application model and vice verse. The script models allow context parameters for the tests to be passed to the testing activities being executed in a codeless manner.

The various models of the app test script model 212 can be considered "codeless" because they preferably do not include software code. Instead, they can be embodied as tables in a spreadsheet. For example, the app test script model 212 could be embodied as an Excel spreadsheet, or other type of spreadsheet, with tables for the test script, script and app models. For examples, the various models could be on separate sheets of the spreadsheet.

Figure 3:
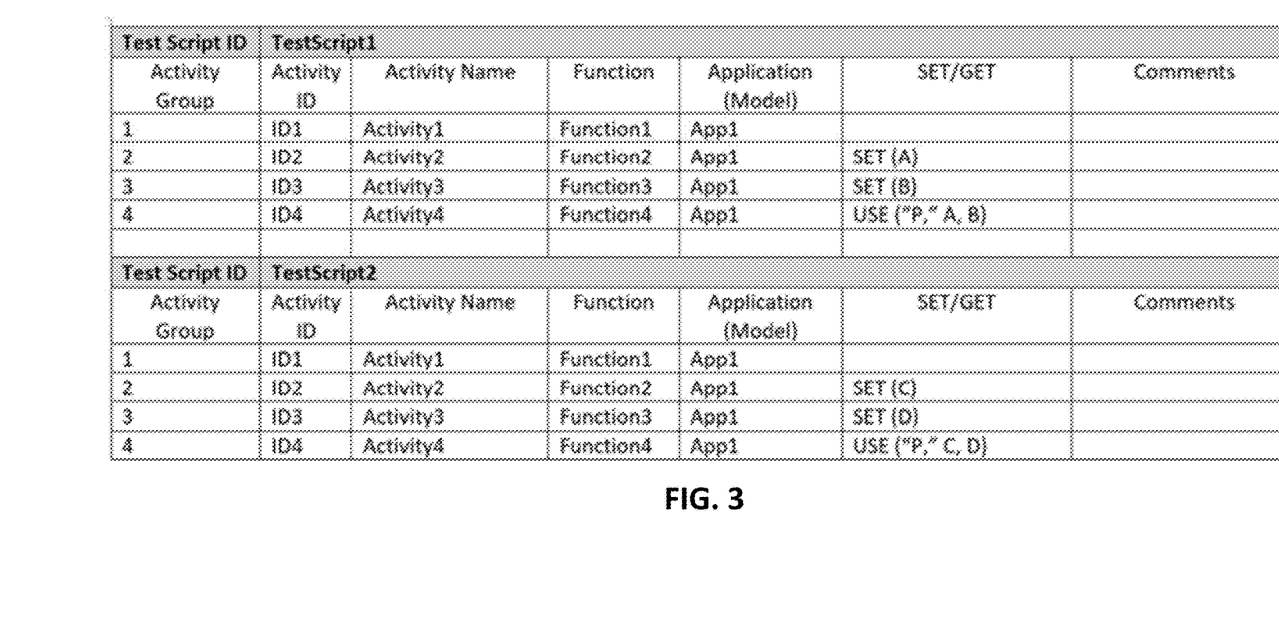
FIG. 3 depicts an example test script model of the app test script model of FIG. 2 according to various embodiments of the present invention.

FIG. 3 is a table that shows an example test script model. The example shown in FIG. 3 includes two test scripts, TestScript1 and TestScript2, for illustrative purposes. In the illustrated embodiment, each test script includes a number of activities that are identified by Activity Group, Activity ID, Activity Name and Function. The numbering of the Activity Group indicates the order in which the activities of the test are performed. Activity ID is an ID number for the activity in the test script. Activity Name is a name for the activity, which may be user-defined. Function may indicate a function in the library of functions available for the test orchestration engine 210. That is, an author of the app test script model 212 might be familiar with the function library for the test orchestration engine 210 and specify the desired library function for an activity of the test script in the Function field. Different test scripts may utilize the same library function or functions. Indeed, some different test scripts may utilize the exact same functions, in the exact same order, but for different applications and/or different values and parameters. The Application Model field identifies the app that the test scrip is for testing. For example, the Application Model field can identify one of the apps 202, 204, 206, 208 in FIG. 2.

The set/get field can be used to specify the values or parameters for the applicable Function of the activity. For example, the set/get field can specify values or parameters, e.g., A, B, C and D, in FIG. 3 that are "set" by the function of the activity, as well as the operation, e.g., P, of the identified function to use on the set values. The operation could be something like comparing the set values or some similar or more complex operations. Finally, the Comments field can provide text that describes the activity for a reader of the app test script model 212.

Figure 4:
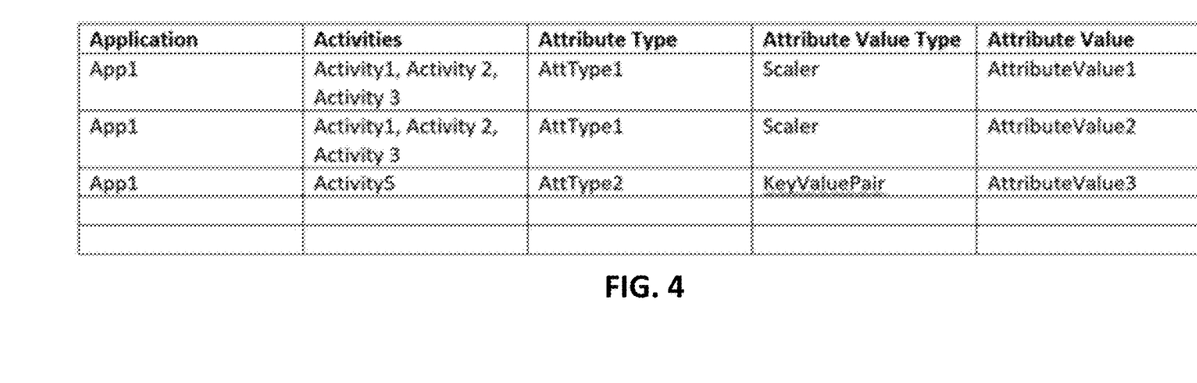
FIG. 4 depicts an example script model of the app test script model of FIG. 2 according to various embodiments of the present invention.

FIG. 4 is a table that shows an example script model. In the illustrated example, the first column can identify the application for the test, i.e., one of the applications 202, 204, 206, 208. For example, the application listed in the Application column corresponds to an application listed in the Application column of the test script model shown in FIG. 3. The Activities column can list one or more of the activities specified in the Activity Name column of a test script in the test script model (see FIG. 3). In the Attribute Type column the author can select from a pre-defined list of attribute types for the activities and the Attribute Value Type field can identify the type of value for the attribute, such as a scalar or key value pair. Next, the Attribute Value field can specify the name for the attribute for the activity(ies) listed in the Activities column. The applications listed in the first column of FIG. 4 are the same ("App1"). The script model could have include multiple different applications in the first column along with their corresponding activities and attributes. In other embodiments, there could be multiple script model sheets in the model 212, each for one or more applications (e.g., one or more different applications listed in the "Application" column).

Figure 5:
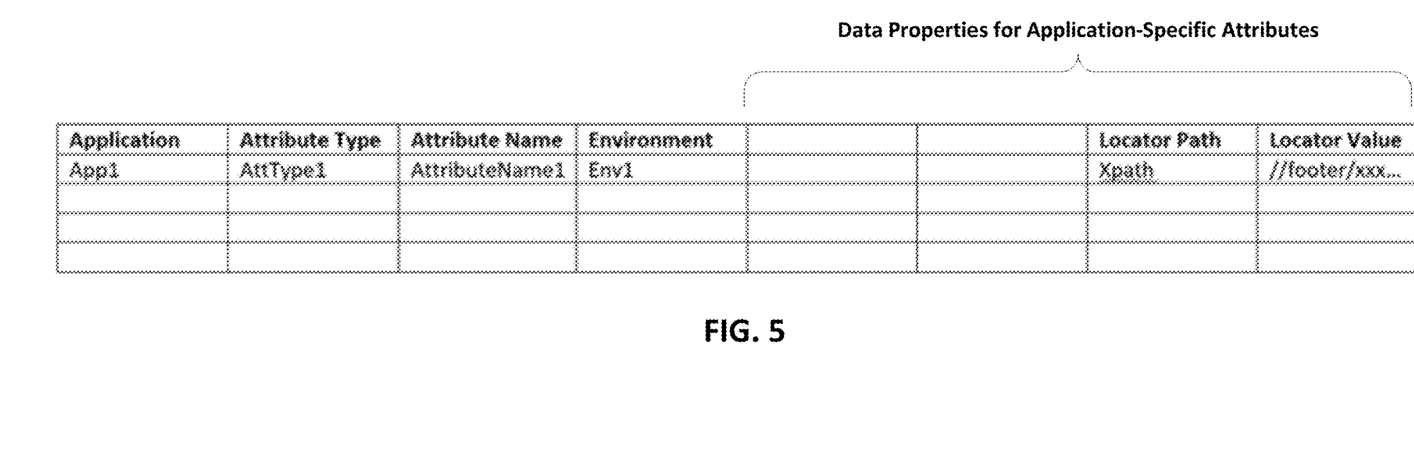
FIG. 5 depicts an example application model of the app test script model of FIG. 2 according to various embodiments of the present invention.

FIG. 5 is a table that shows an example app model. In the illustrated example, the first column identifies the application for the test, i.e., one of the applications 202, 204, 206, 208. The second column and third columns specify, respectively, the applicable attribute type and the attribute name for the application-specific attributes for application to be used in the testing. The attribute type can be one of the attribute types specified in the Attribute Type column in the script model of FIG. 4. The app model can also identify the environment for the application, e.g., the user group at the firm/enterprise that uses the particular application in the Application column. The user groups/environment could be, for example, operations, development, mainframe, etc. The app model may also have several columns specifying data properties for the application-specific attributes specified in each row. These columns are shown generally in FIG. 5 on the right and are specific to the attributes on each row. For example, where the app is a UI app, the data properties might include a locator path for the attribute and a locator value. As shown in the illustrated embodiment, for a UI app, the locator path could be Xpath, for example; and the locator value could be a value for location on the UI. Xpath is a query language for selecting nodes from an XML document.

Figure 6:
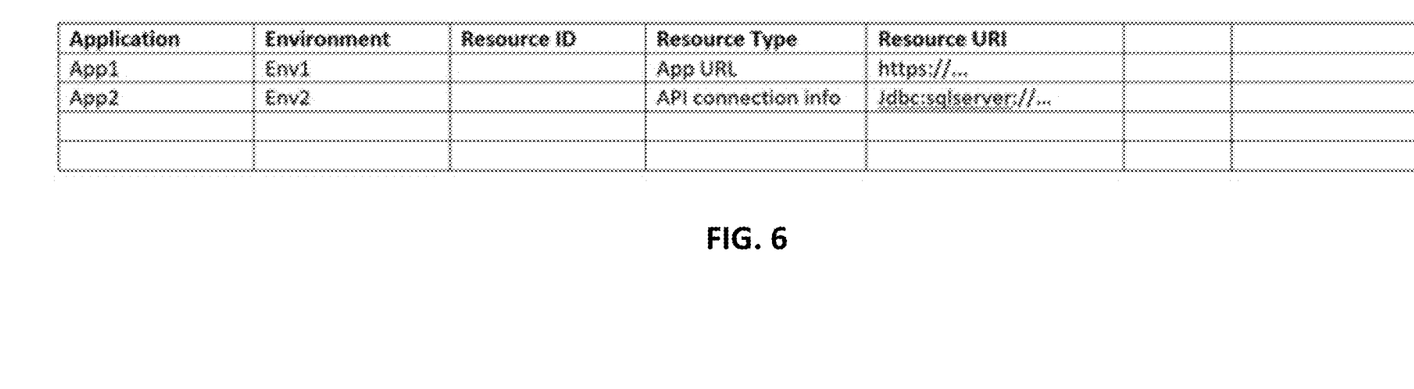
FIG. 6 depicts an example resource model of the app test script model of FIG. 2 according to various embodiments of the present invention.

FIG. 6 is a table that shows an example of the resource model. The first column can identify the applicable application (e.g., application 202, 204, 206, 208 in FIG. 2) for the resource. The second column can identify the environment for the application within the firm/enterprise, e.g., operations, development, mainframe, etc. The third, fourth, and fifth columns can identify, respectively, a resource ID, a resource type, and a resource URI for various resources used by the applications listed in the first column. The resource type could be, for example, a URL within the enterprise computer system for the resource for the application or connection information for an application programming interface (API) used by the resource of the application (e.g., information for a Java Database Connectivity (JDBC) API used by the application).

Each of the test script model, script model, app model and resource model tables can have additional fields/columns as applicable for a particular context and/or implementation.

In operation, according to various embodiments, a "programmer" at a computer device that is in network communication with the test orchestration engine 210 may specify or update the values in cells of the test script model, script model, app model and/or resource model tables of the app test scrip model 212. Assuming the code for the test orchestration engine 210 is already written and operational, the approach described above reduces the need for coding the test scripts to be performed (or orchestrated) by the test orchestration engine 210 because the "programmer" can simply specify the new or updated parameters for the test in the various model tables of the app test script model 212. In various embodiments, the app test script model 212 is stored in a memory of the test orchestration engine 210 (e.g., uploaded from the programmer computer device) and the test orchestration engine 210 converts the app test script model 212 at compile of the test orchestration engine 210 to meta-data code artifacts to be stored in memory of the test orchestration engine 210 and used by the test orchestration engine 210 at runtime. Accordingly, the code artifacts should be in a format suitable for use by the test orchestration engine 210. In various embodiments, the code artifacts may be written in XML- or JSON-based formats, for example. The code artifacts generated from the app test script model 212 at compile time can capture the activities, operations, etc. specified for the tests in the app test script model 212.

Figure 7:
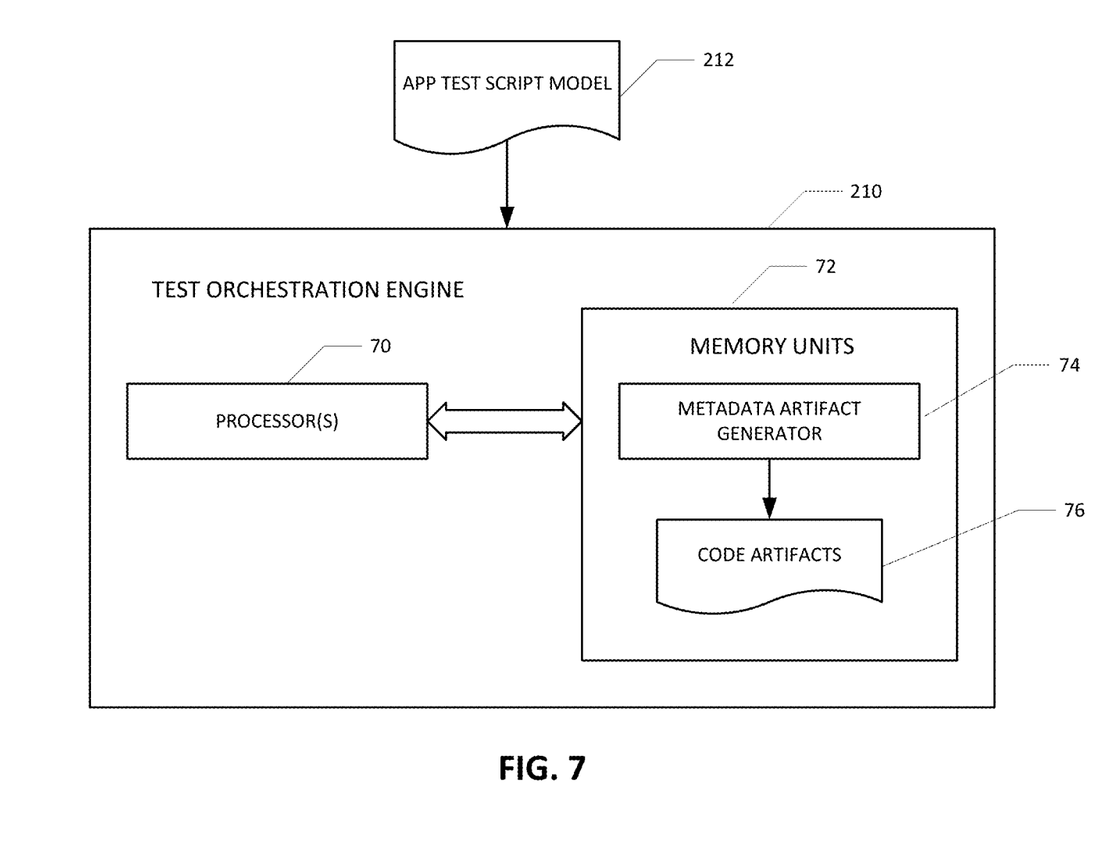
FIG. 7 is a block of the test orchestration engine according to various embodiments of the present invention.

FIG. 7 is a diagram of the test orchestration engine 210 according to various embodiments. As shown in FIG. 7, the test orchestration engine 210 may be implemented with one or more computer systems that comprise one or more processors 70 and associated memory 72. The memory 72, as shown in FIG. 7, may comprise an artifact generator module 74 that comprises software code that, when executed by the processor 70, causes the processor to convert the app test script model 212 into the metadata-driven code artifacts 76 in XML or JSON, for example. In various embodiments, the artifact generator module 74 uses a program written in the Python or Java programming language to perform the conversion, although any other suitable programming language could be used. That is, for example, the test orchestration engine 210 may be implemented by a computer device, such as a server with one or more processor cores 70 and computer memory 72 (e.g., RAM and/or ROM). The memory 72 may store the programming instructions, e.g., the artifact generator module 74, written in the Python or Java programming language, for example, which programs or configures the processor cores 70 of the test orchestration engine 210 to receive the app test script model 212 and convert the various inter-related tables therein to the code artifacts 76 at compile time. The code artifacts 76 can be stored in a memory 72 of the test orchestration engine 210. The processor(s) 70 of the test orchestration engine 210 can then use the code artifacts 76 at run time to perform the tests specified by the app test script model 212.

Figure 8:
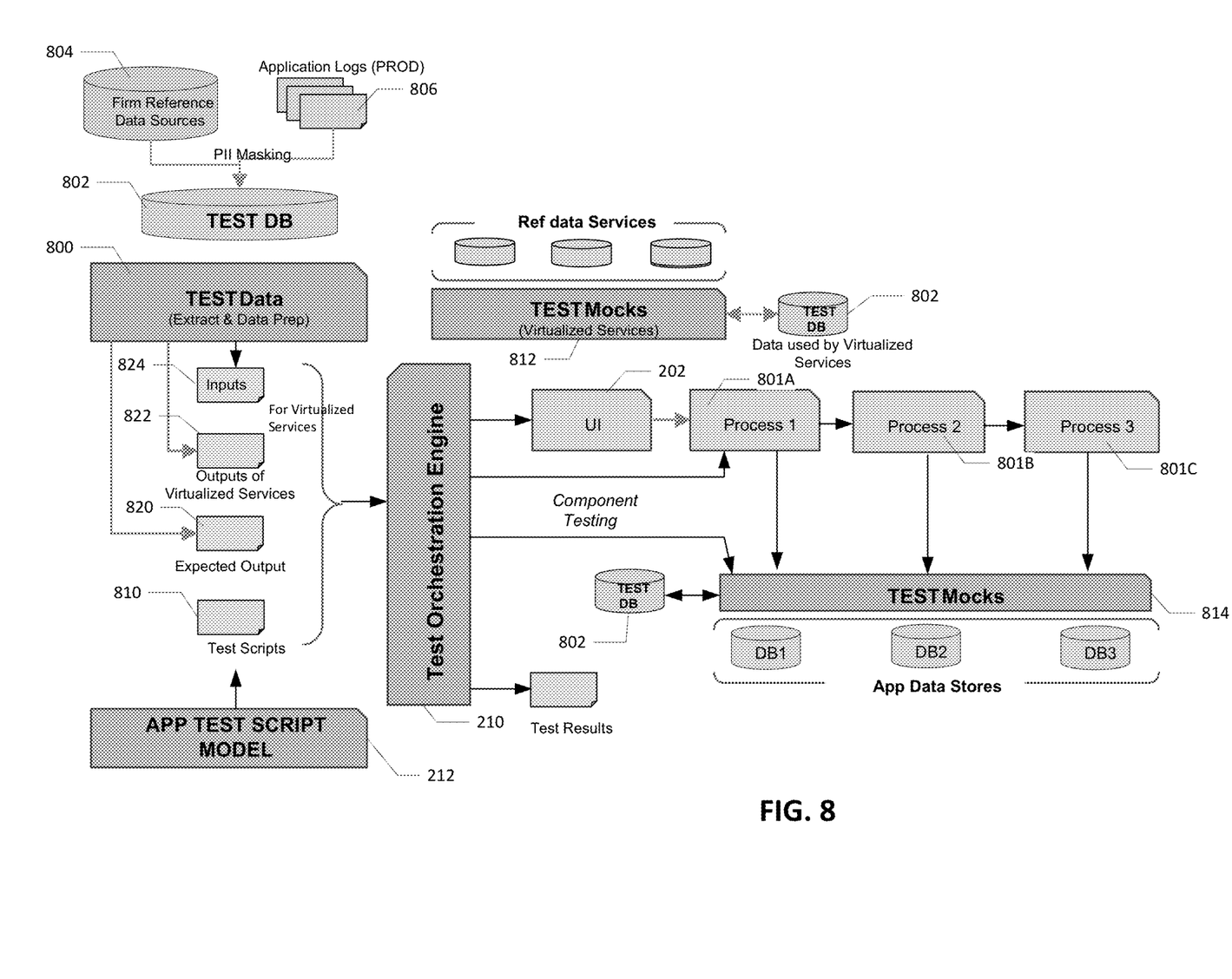
FIG. 8 is a diagram of a virtualized testing system according to various embodiments of the present invention.

Normal, non-testing, operational use of the apps 202, 204, 206, 208 may involve "destructive" data, meaning they result in irreversible data updates preventing them from being re-run successfully without requiring a data refresh. The test orchestration engine 210 can address this dilemma through virtualized end-to-end testing of the systems of the firm/enterprise. FIG. 8 shows a configuration for such virtualized testing of the applications without corrupting or destroying actual firm/enterprise data in the testing process. In the illustrated configuration, the UI app 202 and the processes 801A-C are the system apps being tested. Any downstream service can be virtualized and swapped in with the real one without requiring changes to the calling application. A test data store can be used by the virtual service to satisfy the end-to-end transaction. The transaction context is communicated to the virtual service in an "out-of-band" manner by the orchestration engine 210, thereby eliminating the need to modify the calling application.

Test data 800 can be created for the virtualized testing. The test data 800 can be stored in a testing database or data store 802. The test data can be copied from firm/enterprise reference data sources 804 and production application logs 806. Any personally identifying information (PII) in the first data 804 can be masked or removed from the test data 800. The application logs 806 can be mined to generate expected outputs 820 for the testing activities specified in the app test script model 212. Also, firm/enterprise reference data can be mined to generate inputs 822 and outputs 824 for the virtualized service and data calls; that is, for example, the inputs and outputs of the virtualized service and data calls that the apps 202, 801A-C make when performing the activities specified in the app test script model 212 (and orchestrated by the test orchestration engine 210).

FIG. 8 also shows the app test script model 212, from which the test scripts 810 (e.g., XML or JSON) are created. The test orchestration engine 210 uses the test scripts 810 to orchestrate the testing of the apps 202, 801A-C as described before. As apparent from this description, the test orchestration engine 210 does not need custom coding to perform the application testing. The test scripts 810 can be generated from the app test script model 212. That way, the configuration for the testing can be driven changes or updates to the tables in the app test script model 212, as opposed to coding changes for the test orchestration engine 210.

Also as shown in the example of FIG. 8, dependent service calls by the apps 202, 801A-C can be made to mock/virtualized services created ahead of time, resulting in a stable, repeatable, automated testing experience that can be unattended. Instead of making service and/or data calls to external services and databases, as the apps 202, 801A-C may do during normal, non-testing operation, for the virtualized testing the apps 202, 801A-C may make services and/or data calls to mock/virtualized services 812 and/or mock/virtualized databases 814, as the case may be. The inputs 824 and output 822 derived from the firm/enterprise data and reference logs can be used by the virtualized/mocked services 812, 814 to support independent retrieval of the data. The test database(s) 802 can be reset as desired or necessary to reinitialize the data stores for the apps being tests to supported repeated test execution.

As apparent from the foregoing description, embodiments of the present invention can provide an innovative, extensible light weight testing framework for requirements coverage and testing automation that can be used across multiple roles with a firm/enterprise, particularly a brokerage firm that receives and executes trade orders for financial securities, across multiple technologies that involves a series of sequential or parallel set of testing activities. Those different roles within the firm/enterprise could include, for example, development, quality assurance, performance engine, operations and support. The test scripts executed by the test orchestration engine 210 can be generated without writing code, where actual testing activities are specified in easy to read activities (e.g., in the tables of the app test script model) separate from the details of the underlying application being tested. This separation advantageously ensures that on-going maintenance of the test scripts is low and does not require highly skilled resources.

According to various embodiments, therefore, the present invention is directed to an enterprise computer system that comprises a first sub-system and test orchestration engine. The first sub-system runs a first application. The first application comprises one or more application-specific attributes. The test orchestration engine that is in communication with the first sub-system. The test orchestration engine is configured to receive a human-readable configuration files that comprises: a test script model that specifies testing activities for the first application; an application model that specifies attribute values for the one or more application-specific attributes of the first application for the testing of the first application; and a script model that specifies context parameters for the testing of the first application. The test orchestration engine is further configured to generate, at compile time, metadata code artifacts from the configuration file; and orchestrate, at run time, testing of the first application based on the metadata code artifacts generated from the configuration file. The testing of the first application: performs the activities specified in the test script model for testing the first application; uses the application-specific attributes for the first application in the application model; and uses the context parameters for testing the first application passed from the script model.

According to another general aspect, the present invention is directed to a method for testing the first application of the enterprise computer system. The method comprises the step of receiving, by the test orchestration engine that is in communication with the first sub-system, a human-readable configuration files that comprises: a test script model that specifies testing activities for the first application; an application model that specifies attribute values for the one or more application-specific attributes of the first application for the testing of the first application; and a script model that specifies context parameters for the testing of the first application. The method also comprises the steps of generating, by the test orchestration engine, at compile time, metadata code artifacts from the configuration file; and orchestrating, by the test orchestration engine, at run time, testing of the first application based on the metadata code artifacts generated from the configuration file, such that the testing of the first application: performs the activities specified in the test script model for testing the first application; uses the application-specific attributes for the first application in the application model; and uses the context parameters for testing the first application passed from the script model.

According to various implementations, the first sub-system comprises a middle tier computer sub-system and the first application comprises a middle tier application. In that case, the enterprise computer system can further comprise a middle tier adapter for connecting the test orchestration engine to the middle tier computer sub-system. The middle tier adapter may comprise a REST adapter or a MQ adapter, for example. The first sub-system may also comprise a database computer sub-system and the first application may comprise a database application. In that case, the enterprise computer system may further comprise a database adapter for connecting the test orchestration engine to the database computer sub-system. The first sub-system may also comprise a mainframe computer sub-system and the first application may comprise a mainframe application. In that case, the enterprise computer system may further comprise a mainframe adapter, such as a SOAP adapter, for connecting the test orchestration engine to the middle tier mainframe computer sub-system. The first sub-system may comprise an application server and the first application may comprise a user interface application. In that case, the enterprise computer system may further comprise a user interface adapter for connecting the test orchestration engine to the application server.

In various embodiments, the human-readable configuration file comprises a spreadsheet. The spreadsheet may comprise: a first sheet that comprises the test script model; a second sheet that comprises the application model; and a third sheet that comprises the script model. Also, in various embodiments, the metadata code artifacts are expressed in a XML file.

In various embodiments, the enterprise computer system further comprises a test data store that stores mock test data for service calls made by the first application, where the mock data are used during the testing of the first application.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. It is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for testing a first application of an enterprise computer system, wherein the enterprise computer system comprises a first sub-system that runs the first application, wherein the first application is associated one or more application-specific attributes, the method comprising:

receiving, by a test orchestration engine that is in communication with the first sub-system, a human-readable configuration file that comprises:

a test script model that specifies, in tabular form, testing activities for the first application, such that the test script model comprises one or more rows, wherein each of the one or more rows corresponds to an activity for a test script for the first application;

an application model that specifies, in tabular form, attribute values for the one or more application-specific attributes of the first application for testing of the first application;

a script model that specifies, in tabular form, context parameters for the one or more application-specific attributes in the application model and for the testing activities for the first application specified in the test script model; and a resource model, wherein the resource model identifies, in tabular form, for a combination of an application and an associated user group within the enterprise for the testing of the first application, a resource Uniform Resource Indicator (URI) for a resource to be used in the testing of the first application;

generating, by the test orchestration engine, at compile time, metadata code artifacts from the configuration file; and orchestrating, by the test orchestration engine, at run time, testing of the first application based on the metadata code artifacts generated from the configuration file, such that the testing of the first application:

performs the activities specified in the test script model for testing the first application;

uses the application-specific attributes for the first application in the application model; and uses the context parameters for testing the first application, wherein the context parameters are passed from the script model.

2. The method of claim 1, further comprising, storing mock test data in a test data store, such that services calls made by the first application during the testing of the first application use the mock test data stored in the test data store.

3. An enterprise computer system for testing software applications run by an enterprise, the enterprise computer system comprising:

a first sub-system of the enterprise computer system, wherein the first sub-system runs a first application, wherein the first application is associated with one or more application-specific attributes; and a test orchestration engine that is in communication with the first sub-system, wherein the test orchestration engine is configured to:

receive a human-readable configuration file that comprises:

a test script model that specifies, in tabular form, testing activities for the first application, such that the test script model comprises a first set of one or more rows, wherein each of the one or more rows in the first set corresponds to an activity for a test script for the first application;

an application model that specifies, in tabular form, attribute values for the one or more application-specific attributes of the first application for testing of the first application;

a script model that specifies, in tabular form, context parameters for the one or more application-specific attributes in the application model and for the testing activities for the first application specified in the test script model; and a resource model, wherein the resource model identifies, in tabular form, for a combination of an application and an associated user group within the enterprise for the testing of the first application, a resource Uniform Resource Indicator (URI) for a resource to be used in the testing of the first application;

generate, at compile time, metadata code artifacts from the configuration file; and orchestrate, at run time, the testing of the first application based on the metadata code artifacts generated from the configuration file, such that the testing of the first application:

performs the activities specified in the test script model for testing the first application;

uses the application-specific attributes for the first application in the application model; and uses the context parameters for testing the first application, wherein the context parameters are passed from the script model.

4. The enterprise computer system of claim 1, wherein:
the first sub-system comprises a middle tier computer sub-system; and
the first application comprises a middle tier application.

5. The enterprise computer system of claim 4, further comprising a middle tier adapter for connecting the test orchestration engine to the middle tier computer sub-system.

6. The enterprise computer system of claim 5, wherein the middle tier adapter comprises a Representational State Transfer (REST) adapter.

7. The enterprise computer system of claim 5, wherein the middle tier adapter comprises a message-oriented middleware adapter.

8. The enterprise computer system of claim 1, wherein:
the first sub-system comprises a database computer sub-system; and
the first application comprises a database application.

9. The enterprise computer system of claim 8, further comprising a database adapter for connecting the test orchestration engine to the database computer sub-system.

10. The enterprise computer system of claim 1, wherein:
the first sub-system comprises a mainframe computer sub-system; and
the first application comprises a mainframe application.

11. The enterprise computer system of claim 10, further comprising a mainframe adapter for connecting the test orchestration engine to the mainframe computer sub-system.

12. The enterprise computer system of claim 11, wherein the mainframe adapter comprises a Simple Object Access Protocol (SOAP) adapter.

13. The enterprise computer system of claim 1, wherein:
the first sub-system comprises an application server; and
the first application comprises a user interface application.

14. The enterprise computer system of claim 13, further comprising a user interface adapter for connecting the test orchestration engine to the application server.

15. The enterprise computer system of claim 3, wherein the human-readable configuration file comprises a spreadsheet.

16. The enterprise computer system of claim 15, wherein the spreadsheet comprises:
a first sheet that comprises the test script model;
a second sheet that comprises the application model; and
a third sheet that comprises the script model.

17. The enterprise computer system of claim 3, wherein the metadata code artifacts are expressed in an Extensible Markup Language (XML) file.

18. The enterprise computer system of claim 3, wherein:
the metadata code artifacts are expressed in an Extensible Markup Language (XML) file;
the human-readable configuration file comprises a spreadsheet; and
the spreadsheet comprises:
a first sheet that comprises the test script model;
a second sheet that comprises the application model; and
a third sheet that comprises the script model.

19. The enterprise computer system of claim 18, wherein the spreadsheet further comprises a fourth sheet that comprises the resource model.

20. The enterprise computer system of claim 3, wherein:
the enterprise computer system further comprises a second sub-system that is different from the first sub-system;
the second sub-system runs a second application that is different from the first application;
the second application comprises one or more second application-specific attributes;
the test orchestration engine is additionally in communication with the second sub-system;
the test script model additionally specifies, in tabular form, testing activities for the second application, such that the test script model comprises a second set of one or more rows, wherein each of the or more rows in the second corresponds to an activity for a test script for the second application;
the application model additionally specifies, in tabular form, attribute values for the one or more application-specific attributes of the second application for testing of the second application;
the script model additionally specifies, in tabular form, context parameters for the one or more application-specific attributes in the application model and for activities identified in the test scrip model for the second application;
the test orchestration engine additionally orchestrates testing of the second application based on the metadata code artifacts generated from the configuration file, such that the testing of the second application:
performs the activities specified in the test script model for testing the second application;
uses the application-specific attributes in the application model for testing the second application; and
uses the context parameters for testing the second application passed from the script model.

21. The enterprise computer system of claim 20, wherein:
the first application comprises a user interface application; and
the second application comprises an application selected from the group consisting of a mainframe application, a middle tier application, and a database application.

22. The enterprise computer system of claim 3, further comprising a test data store that stores mock test data for service calls made by the first application, wherein the mock data are used during the testing of the first application.

23. The enterprise computer system of claim 3, wherein the application model further identifies, for each of the attribute values, the associated user group in the enterprise.

* * * * *